United States Patent
Gupta et al.

(10) Patent No.: US 10,341,744 B2
(45) Date of Patent: Jul. 2, 2019

(54) SYSTEM AND METHOD FOR CONTROLLING RELATED VIDEO CONTENT BASED ON DOMAIN SPECIFIC LANGUAGE MODELS

(71) Applicant: NBCUniversal Media, LLC, New York, NY (US)

(72) Inventors: Gaurav Gupta, Englewood Cliffs, NJ (US); William R. Beckett, Englewood Cliffs, NJ (US)

(73) Assignee: NBCUniversal Media, LLC, New York, NY (US)

( * ) Notice: Subject to any disclaimer, the term of this patent is extended or adjusted under 35 U.S.C. 154(b) by 0 days.

(21) Appl. No.: 15/199,641

(22) Filed: Jun. 30, 2016

(65) Prior Publication Data

US 2018/0007448 A1   Jan. 4, 2018

(51) Int. Cl.
  *G11B 27/10* (2006.01)
  *G11B 27/28* (2006.01)
  *G11B 27/34* (2006.01)
  *H04N 5/76* (2006.01)
  *H04N 5/91* (2006.01)
  *H04N 9/82* (2006.01)
  *H04N 21/235* (2011.01)
  (Continued)

(52) U.S. Cl.
  CPC ......... *H04N 21/8106* (2013.01); *G11B 27/28* (2013.01); *G11B 27/34* (2013.01); *H04N 5/76* (2013.01); *H04N 5/91* (2013.01); *H04N 9/8205* (2013.01); *H04N 21/2358* (2013.01); *H04N 21/2665* (2013.01); *H04N 21/4622* (2013.01); *H04N 21/4884* (2013.01); *H04N 21/8133* (2013.01); *H04N 21/8405* (2013.01); *G10L 13/00* (2013.01); *G10L 15/08* (2013.01); *G10L 15/26* (2013.01); *G10L 25/87* (2013.01); *G11B 27/10* (2013.01)

(58) Field of Classification Search
  CPC .................. G11B 27/10; G06F 17/0289; G06F 17/30598; G06F 17/307463; G09G 3/18; G10L 13/00; G10L 15/08; G10L 15/26; G10L 25/87
  USPC ......... 386/241; 704/233, 235, 253, 254, 260
  See application file for complete search history.

(56) References Cited

U.S. PATENT DOCUMENTS

| | | | | |
|---|---|---|---|---|
| 6,243,676 B1 * | 6/2001 | Witteman | ......... | G06F 17/30017 704/243 |
| 8,006,268 B2 * | 8/2011 | Sloo | .................. | G06F 17/30796 707/706 |

(Continued)

*Primary Examiner* — Thai Q Tran
*Assistant Examiner* — Syed Y Hasan
(74) *Attorney, Agent, or Firm* — Lee, Hong, Degerman, Kang & Waimey PC

(57) ABSTRACT

Systems and methods for controlling related video content based on domain specific language models are disclosed. Some embodiments include one or more processors configured to obtain a first audio information of first video content, identify first primary time codes based on the first audio information, obtain second audio information of second video content and identify a first secondary plurality of time codes based on the second audio information, determine an amount of differences between the first primary time codes and first secondary time codes, and generate information indicating whether the first video content and the second video content are related based on the determined amount of differences.

23 Claims, 8 Drawing Sheets

(51) Int. Cl.
　　　*H04N 21/2665*　　(2011.01)
　　　*H04N 21/462*　　　(2011.01)
　　　*H04N 21/488*　　　(2011.01)
　　　*H04N 21/81*　　　　(2011.01)
　　　*H04N 21/8405*　　(2011.01)
　　　*G10L 13/00*　　　　(2006.01)
　　　*G10L 15/08*　　　　(2006.01)
　　　*G10L 15/26*　　　　(2006.01)
　　　*G10L 25/87*　　　　(2013.01)

(56) References Cited

U.S. PATENT DOCUMENTS

| | | | |
|---|---|---|---|
| 8,972,416 B1* | 3/2015 | Rifkin | G06F 17/30985 |
| | | | 704/231 |
| 2009/0164217 A1* | 6/2009 | Arrowood | G10L 15/14 |
| | | | 704/254 |
| 2010/0223056 A1* | 9/2010 | Kadirkamanathan | G10L 13/08 |
| | | | 704/235 |
| 2013/0132170 A1* | 5/2013 | Yelisetti | G06Q 30/02 |
| | | | 705/14.4 |
| 2015/0015680 A1* | 1/2015 | Wang | H04N 13/04 |
| | | | 348/51 |

\* cited by examiner

| Keyword | Touchdown |
|---|---|
| Time Point 1 | 00:01:30 |
| Time Point 2 | 00:18:45 |
| Time Point 3 | 00:18:47 |
| Time Point 4 | 00:19:09 |
| Time Point 5 | 00:40:20 |
| Time Point 6 | 00:42:10 |
| Time Point 7 | 00:42:15 |
| Time Point 8 | 01:05:05 |

FIG. 4A

| Keyword | Touchdown |
|---|---|
| Interval 1 | 1035 |
| Interval 2 | 2 |
| Interval 3 | 22 |
| Interval 4 | 1271 |
| Interval 5 | 10 |
| Interval 6 | 5 |
| Interval 7 | 1370 |

FIG. 4B

SYSTEM AND METHOD FOR CONTROLLING RELATED VIDEO CONTENT BASED ON DOMAIN SPECIFIC LANGUAGE MODELS

With significant improvements in the delivery of consumable media, the availability of video content has greatly increased. Larger bandwidth allows for faster and more frequent distribution of high quality video to consumers and the number of consumers of video content is correspondingly expanding. Improvements in device technology, particularly smartphones, tablets, laptop computers, and the like have also greatly increased demand for video content, as well as demand for increased producers and distributors of video content.

Conversely, improvements in technology have also allowed more producers and distributors of video content to generate quality content that is able to reach a larger number of intended consumers. Additionally, the internet has connected content producers and content consumers from across the globe, where previously, video content produced in international countries may not have been accessible or even known to foreign consumers. All of these factors have contributed to a great increase in the amount of video content being recorded, produced, distributed, and consumed. One result of this massive increase in video content has been that numerous different video media may be produced and generated even where they relate to the same subject matter or event.

For example, a large scale event may be considered, such as the SUPERBOWL. For such a large scale event, numerous content producers may actively generate video content corresponding to the same game being played, resulting in video information, audio information, or both, being slightly different from one video file to another video file, despite them being based on the same game. Each content producer may use its own cameras, production equipment and teams, and techniques to generate completely different video from another content producer for the same game or event.

For such events, it may also be the case that one aspect (for example, video, audio, or visual graphics) of different pieces of content may be the same, while another aspect of the content is vastly different, thereby constituting a completely distinct piece of media, albeit still pertaining to the same event. For example, five different television broadcasting entities may obtain a video recording of the SUPERBOWL football game from the main entity responsible for, or granted sole rights to, record and produce video media. However, each television broadcasting entity may incorporate audio using its own commentators for the football game. Accordingly, while the corresponding video content may be exactly the same as each broadcasting entity received it from the main video creating entity, the audio associated with each content file may be completely different.

The generation of so many variations of video content related to the same underlying subject matter or event creates an issue for content distributors that employ automated broadcasting systems existing in the known art, wherein the automated broadcasting systems may use methods for video or audio detection to identify content. Where the known automated broadcasting system is not able to identify that two pieces of media content are actually related to the same subject matter or event due to differences in the audio or variations in the video, the automated broadcasting system may erroneously select multiple consecutive content for distribution that are related to the same subject matter or event.

For example, a content production generator tasked with identifying, organizing, and compiling multiple items of content clips to produce a longer form content for distribution may select a clip from a first television broadcaster's production of a SUPERBOWL football game which was produced with the first broadcaster's team of commentators providing the audio commentary. Directly following this selected clip, the production generator may select a second clip of a television broadcaster's production of the same SUPERBOWL football game which was produced with the second broadcaster's team of commentators providing the audio commentary. Since the audio information of the two pieces of media content is completely different, the production generator may determine that they correspond to two different football games or two different portions of the same SUPERBOWL football game, when this is in fact not the case.

Accordingly, in this example, video production systems which gather and identify content from various sources, such as the internet, to incorporate into and produce longer form content are unable to determine whether two pieces of content relate to the same underlying event or clip, resulting in redundant clips of content being gathered and inserted for viewing.

Thus, current computer hardware and/or software systems used for analyzing, identifying, selecting, distributing, displaying, and controlling media content fail to provide the ability to effectively and accurately determine related video content based on particular aspects of an event being described within the content. Thus, it may be advantageous for a system and method to improve existing systems for determining related video content based on domain specific language models for more effective identification, broadcast, display, and control of said related video content.

SUMMARY

Embodiments of the present disclosure include a system and method for controlling video content based on domain specific language models. The domain specific language models may be configured to include terms or phrases specific to a type of content being identified. The specific language model may be selected after an initial analysis of the media content. Domain specific terms and/or phrases within a selected language model may be identified in the audio corresponding to the media content, and relative occurrences of a particular term or phrase may be identified and compared.

Time coded keywords may be generated and stored to be associated with the particular media content. Keyword occurrence information, otherwise referred to as time code information, of a particular domain specific term for a first content may be compared to time code information of the same particular domain specific term for a second content, and differences in the relative occurrence information may be used to determine relatedness of the first and second content. Confidence models, probability factors, and the like may be implemented to generate a determination on whether the first content and the second content are related, or correspond to the same video content. Based on a determination, certain content may be selected over another and selected for inclusion in a broadcast production, display, presentation, storage, and the like.

An embodiment of a system of the present disclosure includes a memory configured to store information; a communication unit configured to transmit and receive information; and one or more processors configured to: obtain first audio information of first video content; identify a first primary plurality of time codes corresponding to one or more occurrences of a first keyword relative to each other within the first audio information; obtain second audio information of second video content; identify a first secondary plurality of time codes corresponding to one or more occurrences of the first keyword relative to each other within the second audio information; determine an amount of differences between the first primary plurality of time codes and the first secondary plurality of time codes; generate information indicating whether the first video content and the second video content are related based on the determined amount of differences and transmit the generated information via the communication unit.

A method according to an embodiment of the present disclosure may include obtaining first audio information of first video content; identifying a first primary plurality of time codes corresponding to one or more occurrences of a first keyword relative to each other within the first audio information; obtaining second audio information of second video content; identifying a first secondary plurality of time codes corresponding to one or more occurrences of the first keyword relative to each other within the second audio information; determining an amount of differences between the first primary plurality of time codes and the first secondary plurality of time codes; generating information indicating whether the first video content and the second video content are related based on the determined amount of differences and transmitting the generated information.

BRIEF DESCRIPTION OF THE DRAWINGS

The above and other aspects and features of the present disclosure will become more apparent upon consideration of the following description of embodiments, taken in conjunction with the accompanying drawing figures.

FIGS. 4A and 4B are illustrations of keyword occurrence data generated by the system according to one embodiment of the present disclosure.

DETAILED DESCRIPTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, electrical, as well as procedural changes may be made without departing from the scope of the present invention. Wherever possible, the same reference numbers will be used throughout the drawings to refer to the same or similar parts.

Embodiments of the present invention relate to a system and method for controlling related video content based on domain specific language models. In this disclosure, the content will be discussed primarily with respect to video content, however, various applications of the systems and methods disclosed herein to other media are contemplated, including, but not limited to television, radio, digital video recorder media, internet radio, internet video, other forms of streaming content, virtual reality content, and the like.

Figure 1:
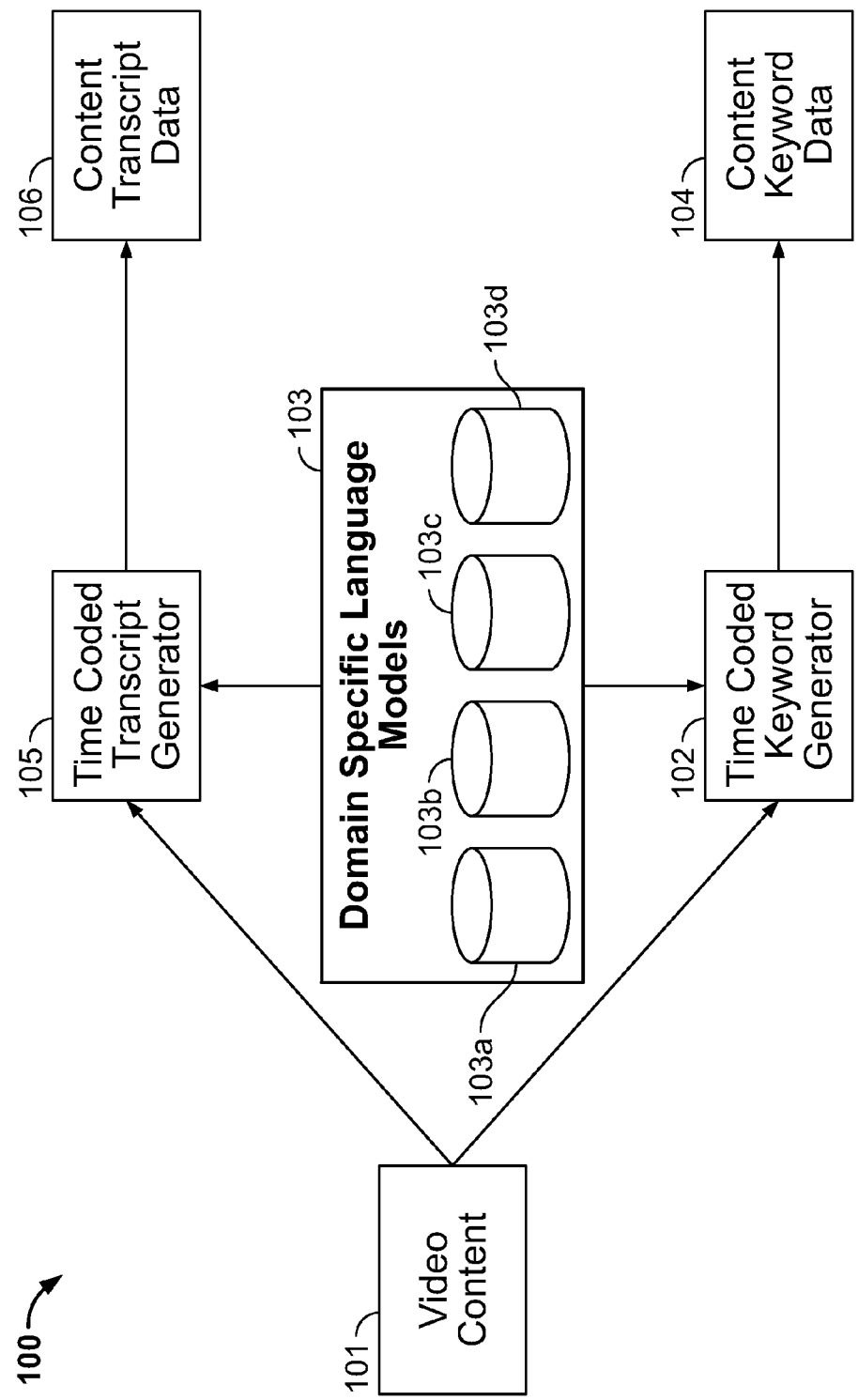
FIG. 1 is an illustration of a system for controlling display of related video content based on domain specific language models in accordance with an embodiment of the present disclosure.

Referring to FIG. 1, an aspect 100 of a system for controlling related video content based on domain specific language models is shown. The system 100 may be configured to identify relatedness of a first content 101 corresponding to a first video file and second content corresponding to a second piece of video. In some embodiments, the video files may correspond to commonly known compressed or uncompressed file formats including MPEG-1, MPEG-2, MPEG-4, H.264, AVC, DV, DVCAM, AVI, ASF, MOV, WMV, and the like, however the disclosure is not limited thereto and those of ordinary skill in the art will understand applicability to numerous other compressions and formats. The video files may be provided to system 100 from various sources of video, including television broadcast, cable video distribution systems, satellite content distribution, internet video, streaming video, mobile video distribution systems, digital video downloads, and the like, however the disclosure is not limited thereto and those of ordinary skill in the art will understand applicability to numerous other sources of video content.

In the embodiment of FIG. 1, various video content 101 may be stored by a network attached storage or other memory configured to store content, including a networked server computer. The system 100 may include a time coded keyword generator 102 for generating time coded keywords identified within the video content. Generation of the time coded keywords may include implementation of various keyword spotting methods known by those of ordinary skill in the art, including acoustic keyword spotting, phonetic search keyword spotting, and the like.

The time coded keyword generator 102 may utilize the audio information of a particular video content 101 and output time coded keyword information 104 specific to that particular video content. For example, the time coded keyword generator 102 may output an identifier of the particular video file, along with information such as the identified keyword, each time code of each occurrence of the keyword, a start time, an end time, a confidence interval related to the identification of the keyword occurrence, and the like. The output content keyword data 104 may be stored in a database configured to store time coded keyword data along with other data regarding the processed video content, such as speech to text, transcript information, metadata information, and the like.

The system 100 may also include a time coded transcript generator 105 which utilizes audio information of a particular video content 101 and outputs time coded transcript information. Time coded transcript generator 105 may receive audio information of video content, analyze the audio information from the video content file, and generate content transcript data 106 of the audio information of recognized words, sounds, music, and the like included in the video content.

The time coded transcript generator 105 may also store information related to time codes of the transcript information, including the particular time points within the content where particular words within the transcript occur. In some embodiments, corresponding time codes may be stored for each word within the transcript, or time codes may be identified and stored for particular words within the transcript, such as particular keywords. Speech-to-text, voice recognition, music recognition, and sound recognition techniques known in the art may be utilized by the time coded transcript generator 105 to generate content transcript data 106.

In some embodiments, the time coded transcript generator 105 may generate the transcript information and store it in a database configured to store time coded transcript data. In some embodiments, the time coded transcript information may be stored in the same memory location as the stored time coded keyword information.

In some embodiments, the system 100 may utilize domain specific language models 103, comprising various domain specific language models 103a, 103b, 103c, 103d corresponding to language models of various domains. The domain specific language models 103 may be utilized by the time coded keyword generator 102 and the time coded transcript generator 105 to identify domain specific language to generate the content keyword data 104 and the content transcript data 106. While representations of four language models are depicted herein, it will be understood by those of ordinary skill in the art that this is not limiting, and the language model database 103 may be configured to store a large number of language models. The system 100 may further include a speech to text processor (not depicted) for processing the audio information of the video content as well as the information from the domain specific language models 103.

In one example, each of the domain specific language models 103a-103d may correspond to specific language used with respect to a particular sport. In this example, 103a may correspond to the subject domain of baseball, 103b may correspond to the subject domain of basketball, 103c may correspond to the subject domain of football, and 103d may correspond to the subject domain of hockey. In yet another embodiment, the language models may be even more specific, where each of the language models 103a-103d correspond to specific words relevant to a specific professional team of a sport. In such an example, as further discussed below, the language models may include team nickname, players' names, coaches' names, and the like.

In another example, each of the domain specific language models 103a-103d may correspond to specific language used with respect to different genres of content, such as politics, music, sports, cooking, home renovation, reality television, popular culture, U.S. news, international news, performing arts, and the like. In some embodiments, the domain specific language models 103a-103d may be implemented to include subgroups of language models, wherein the domain specific language models 103a-103d includes one or more sub language models specific to a particular aspect of a common category.

For example, language model 103a may correspond to content related to finance, and sub language models within language model 103a may each correspond to a subgroup (not depicted) within the finance category, for example where each subgroup corresponds to language particularly used for a particular financial sector including energy, transportation, technology, biotech, and the like. In some embodiments, the domain specific language models 103a-103d may further include non-word based information such as symbols, abbreviations, initials, and the like. For example, where a domain specific language model is related to finance, the language model may be configured to include stock symbols, company abbreviations, and the like.

Figure 2:
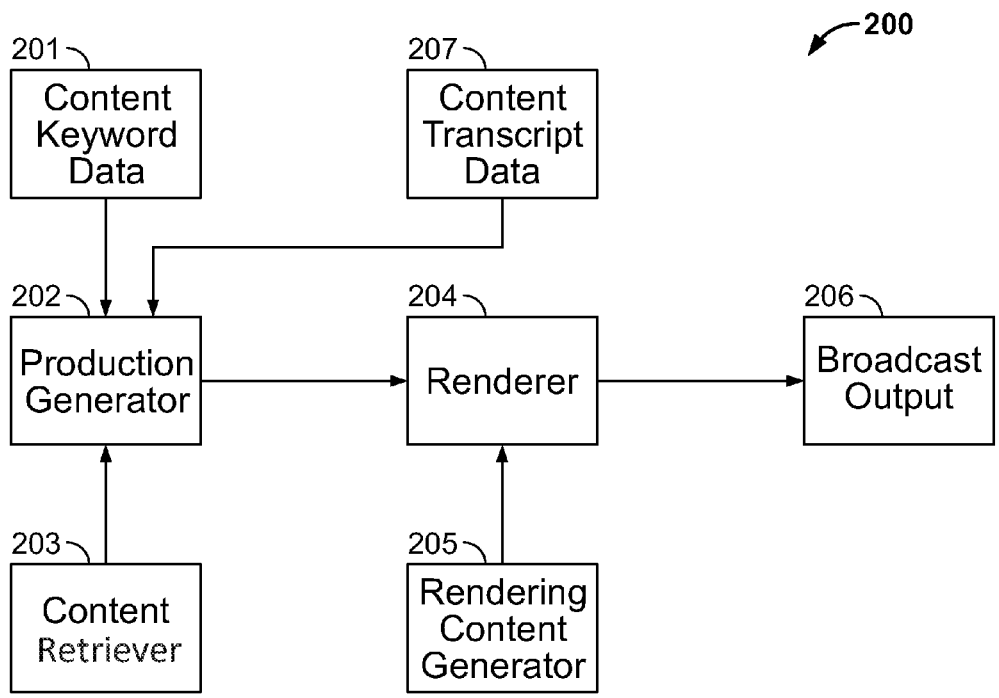
FIG. 2 is an illustration of an aspect of an embodiment of a system for controlling related video content based on domain specific language models.

Referring now to FIG. 2, another aspect 200 of a system for controlling related video content based on domain specific language models is shown. The system may be utilized for producing broadcast content related to a desired storyline or theme. The broadcast content may be comprised of two or more shorter content items which are presented in a particular order, length, appearance, theme, time, and the like, to effectively convey the desired storyline or theme of the overall broadcast content. The system may be configured to identify, analyze, retrieve, coordinate, and combine various files to produce and render content to be distributed and broadcast for viewing. The system may receive an input of a desired storyline or theme for the broadcast content, and the input information may be used to identify relevant content items and coordinate the relevant content items to produce desired output content.

The system may include or be otherwise in communication with a terminal computer, server computer, or client computer (not depicted) via a data communication network comprising a local area network (LAN), a wide area network (WAN) (e.g., the Internet), a telephone network, a satellite or wireless communication network, or some combination of these or similar networks. As further discussed herein, the terminal or computer may include a combination of software and hardware, including one or more processors, a display, input and output units, a memory, and communication units including transmitters and receivers. The memory of the computer may store audio and video content, metadata, transcript information, and the like. The terminal or computer may be configured to receive inputs from an operator or a user, store the received input information in a memory, and transmit received input information to the system or other aspects of the system.

The system may include a production generator 202 configured to construct content output for broadcast based on the input desired storyline. In some embodiments, the production generator 202 may utilize a production selector (not depicted) which determines the desired content, structure, order, appearance, and script using retrieved content items to align with the input desired storyline. The production generator 202, according to the production selector, may transmit a message, or otherwise cause content retriever 203 of the system to search for, identify, and retrieve various content related to the desired storyline. The production generator 202 may transmit to the content retriever various metadata related to the desired storyline to be used in content identification and retrieval.

For example, if an input desired storyline for content is the "2016 New York Jets football team," the production generator may utilize metadata related to the desired storyline to construct the broadcast content. The metadata may be used according to the production selector to determine the type of content relevant to the metadata that is desired in order to construct the broadcast content in an effective manner according to the desired storyline. The metadata may be used to search for, identify, and retrieve relevant content by content retriever 203.

Content retriever 203 may use the metadata provided by the production algorithm to search media items stored in the content files 101 discussed with respect to FIG. 1, wherein the content files are stored in a network attached storage, or other form of memory location or device in communication with the content retriever. In some embodiments, the content retriever 203 may be configured to search for, identify, index, and retrieve content from various sources, including networked and integrated memory, third party databases, website and online videos, streaming media, social media content, and the like.

The content identified and retrieved by content retriever 203 may be indexed and associated with a unique media identifier which corresponds to similarly identified time coded keyword information generated by the time coded keyword generator 102 and stored as content keyword data 201. In some embodiments, the content transcript data 207 generated by the time coded transcript generator discussed with respect to FIG. 1, may include time coded transcript data which corresponds to the unique media identifier.

Where the content retriever 203 returns two or more content items identified to be suitable for the desired storyline or theme, the production generator 202 may retrieve time coded keyword information from the content keyword data 201 associated with the retrieved content items. Using the time coded keyword information as will be discussed further herein, the production generator 202 may determine whether the two or more content items retrieved by the content retriever 203 actually correspond to the same or very similar underlying content.

In some embodiments, where the content retriever 203 returns two or more content items identified to be suitable for the desired storyline or theme, the production generator 202 may retrieve time coded transcript information from the content transcript data 207 associated with the retrieved content items. Using the time coded transcript information, similar to the use of the time coded keyword information, the production generator 202 may determine whether the two or more content items retrieved by the content retriever 203 actually correspond to the same or very similar underlying content.

The production generator 202 will be discussed as utilizing the time coded keyword data from content keyword data 201 to determine whether two or more content items retrieved by the content retriever 203 correspond to the same or very similar underlying content. However, it is contemplated that the production generator 202 may obtain time coded information related to the respective two or more content items from various sources in generating the determination, including the time coded transcript information provided by the content transcript data 207, time coded closed captioning information, speech to text output information, object oriented data structure representations of audio or transcript information, time coded visual object recognition information associated with keywords, time coded visual graphic text recognition information associated with keywords, and the like.

For example, using the time coded keyword information, the production generator 202 may determine that two retrieved content items correspond to the same or similar highlight clip from the same football game played by the 2016 New York Jets. The content items may slightly vary in that they correspond to clips produced by different production entities, include different camera angles, or different rendered appearance, but the underlying content (the football play) may be the same. However, using the time coded keyword information, the production generator is able to determine that they in fact correspond to the same underlying content and based on this can exclude one over the other so that the final output content to be rendered and broadcast does not include redundant content.

The production generator 202 may perform comparison of all content retrieved by the content retriever 203 using each content item's corresponding time coded keyword information obtained from the time coded keyword data 201. Where two content items are determined to correspond to the same underlying content, the production generator may select only one of the two and select another third content item such that no redundant content is included in the broadcast content output. The production generator 202 may thus select and compile various content items for inclusion into the broadcast content and cause the renderer to receive information of the selected content items to the renderer 204. The renderer 204 may retrieve the actual media associated with the content items, for example from a networked attached storage as discussed in FIG. 1, and render the final video media file to be broadcast.

Figure 3:
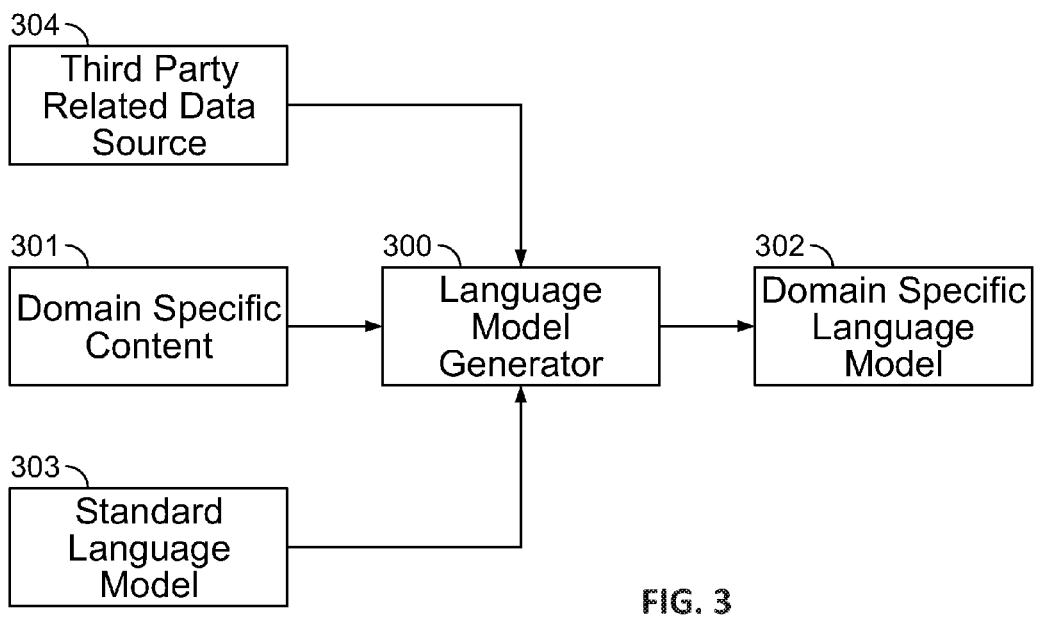
FIG. 3 is an illustration of an aspect of an embodiment of a system for storing domain specific language models.

The renderer 204 may obtain additional rendering information from rendering content generator 205. Rendering content generator 205 may be configured to render visual information to be rendered and displayed along with the content items selected by production generator 202. For example, rendering content generator 205 may provide renderer with visual graphics, theme colors, logos, visually displayed information, visual overlay information, and the like, which may be used to generate rendered final output content to be broadcast. In one embodiment, where the content selected by the production generator corresponds to a highlight of a particular player on the New York Jets, the rendering content generator 205 may use metadata associated with the selected content to provide visual information including information of the particular player, profile image of the particular player, a logo image of the New York Jets, visual statistics information of the particular player, and the like. The information provided by the rendering content generator 205 may be utilized to render broadcast output 206. Referring now to FIG. 3, an aspect 300 of an embodiment of the system is depicted which is configured to generate the language model database discussed above. The system may include a language model generator 300 which receives transcript information of numerous pieces of content from domain specific content source 301. The language model generator 300 may be in communication with the domain specific content source 301 via a network (not depicted), such as the internet, and other embodiments as discussed above. In some embodiments, the domain specific content source 301 may be configured to store and provide content related to one particular domain, and thus the language model generator 300 may be in communication with numerous domain specific content sources (not depicted), each related to a specific domain and storing specific domain content. Alternatively, the domain specific content source 301 may also store and provide more general content relating to a wide array of different domains.

The domain specific content source 301 may be configured to provide the entire video file of content, only the audio information related to the video file, or in some embodiments may only store and provide textual transcript information related to the video file of content. In some embodiments, the textual transcript information may be generated or obtained from closed captioning information related to the video file, or may be pre-generated and stored from speech and voice recognition processes and systems known in the art.

Utilizing transcript information received from the domain specific content 301, the language model generator 300 is configured to generate data comprising words, phrases, terms, sentences, names, and the like which are specific to a particular identified domain.

In some embodiments, the language model generator 300 may be provided with the transcript information and metadata identifying a category or subject matter of the associated content. Using the received metadata, the language model generator 300 may identify a particular domain to be assigned to the language model being generated. The language model generator 300 may accordingly store the language model information to be associated with metadata identifying the assigned domain related to the stored information.

In other embodiments, the language model generator 300 may be configured to read in a portion of the transcript information to determine a domain or subject matter pertaining to the associated content in order to identify a particular domain to be assigned to the language model data to be stored. In such embodiments, the language model generator 300 may sample a consecutive portion of the transcript information, or the language model generator 300 may use samples of non-consecutive portions of the transcript information to determine the relevant domain or subject matter.

In identifying a domain or subject matter, some embodiments of the language model generator 300 may utilize information generated by a content evaluator (not depicted) which is in communication with the language model generator 300. The content evaluator may determine a relevant domain or subject matter by comparing words occurring in the transcript information with other language models stored in the language models database. For example, where certain domain specific words such as "football," "tackle," "touchdown," and the like, occur with a high rate of frequency, or occur at particular time points which are indicative of relative importance or prominence within the transcript information, the content evaluator may generate information to assign the "football" domain metadata to the language model being generated.

Further, the language model generator 300 may also process the transcript information relative to data from non-domain specific standard language model database 304. The standard language model database 304 may store and provide lexicon information for standard language words, terms, phrases, sentences, names, and the like which are not specific to any domain or subject matter. The information from the standard language model database 304 may be used by language model generator 300 to determine whether particular words, terms, phrases, sentences, names, and the like recognized in the transcript information is included in the standard language lexicon, or whether it is specific to a particular domain.

For example, when the language model generator 300 recognizes the proper noun "Dallas Cowboys," it may perform a search, or cause a server computer, configured to maintain and provide information from the standard language model database 304, to perform a search using the encountered term. The language model generator 300 may receive generated information that the term "Dallas Cowboys" is not present in the standard language model database 304, and based on this may include the term into the domain specific language model being generated. The standard language model database 304 may be implemented from data received from known sources, such as dictionaries, standard speech and voice recognition databases, and the like, which are not dedicated to any particular domain or subject matter.

In some embodiments, the language model generator 300 may retrieve search information from the standard language model database 304 for every identified word, term, phrase, sentence, name, or the like to determine whether it should be included in the domain specific language model 303. In other embodiments, the language model generator 300 may recognize and identify a plurality of candidate words, terms, phrases, sentences, names, and the like based on the rate of occurrence within the transcript information, timing of each occurrence, ranking information based on a ranked importance of each word to the content, or other factors to determine importance, prominence, and frequency of each word, term, phrase, sentence, name, or the like within the context of the content. The candidate list may then be searched within the standard language model database 304 to perform a check as an additional determination factor for including it into the domain specific language model 303.

In other embodiments, the language model generator 300 may also receive information from a third party related data source 305 via the network, such as the internet. In some cases, the language model generator 300 may be provided with metadata related to an identified domain or subject matter of the content, or the language model generator 300 may identify a specific domain or subject matter through sampled or complete processing of the transcript information as discussed above. Using metadata obtained by these means, the language model generator 300 may request information related to the metadata from a third party related data source 305. The third party related data source 305 may correspond to data repositories, databases, third party web sites, social media information, and the like, which is provided to language model generator 300 via network.

For example, where the language model generator 300 is provided with metadata that particular transcript information relates to a Dallas Cowboys football game, the language model generator 300 may request information from the third party related data source 305 related to the term "Dallas Cowboys." In such a case, the third party related data source 305 may correspond to the Dallas Cowboys website, a collaborative information website such as WIKIPEDIA related to the Dallas Cowboys, social media data tagged with metadata associated with the Dallas Cowboys, and the like. The third party related data source 305 may provide related information such as roster information including all player names, coach names, stadium information, historical team data, and the like. The language model generator 300 may parse the received information and store each word, name, phrase, and the like into the domain specific language model 303 for the content.

The language model generator 300 may also be configured to include ranking information indicating importance of each keyword included in the language model. This ranking information may be based on factors such as a rate of occurrence within content related to the domain, timing of each occurrence of the keyword within particular phrases or sentences, proximity of occurrences of the keyword from other known high-ranked keywords, and the like. Thus, the domain specific language model 303 may store each keyword with an associated ranking indicator or weight, corresponding to its importance or rank within the domain lexicon.

Referring back to FIG. 1, each language model 103*a*-103*d* may include keywords specific to a particular domain. This may include words that are not used, or seldom used, in non-domain specific, standard lexicon based speech. This may also include phrases, terms, and strings of words composed of standard lexicon words, where the combination of the standard lexicon words are determined to be specific to a particularly domain. For example, in a football-domain specific language model, the words and or terms "touchdown," "first down," "quarterback," "halfback," "touchback," "kick-off," "goal posts," "pass interference," and "linebacker" may be stored as keywords. In another example, the words or terms "homerun," "pick-off," "double play," "ground rule double," "strikeout," "swinging strike," "slider," "changeup," "fastball," "intentional walk," and "bullpen" may be stored as keywords in a baseball-domain specific language model.

Additionally, domain specific language models may also be configured to store proper nouns specific or relevant to the subject matter of the domain. For example, in a football-domain specific language model, proper nouns corresponding to team names, player names, coach names, cities, stadium names, and the like may be included. Therefore, to further the above example, a football game content including the Dallas Cowboys may include the proper nouns "Tony Romo," "Dez Bryant," "Ezekial Elliot," "Jason Witten," and the like, corresponding to individual player names on the roster of the Dallas Cowboys.

Using the keywords stored in a domain specific language model 103a-103d of the language model database 103, the time coded keyword generator 102 may identify all occurrences of one or more keywords within the audio information of content. The occurrences of one keyword at a time may be determined with respect to the audio information, and the time coded keyword generator 102 may evaluate the audio information for each and every keyword from the domain specific language model 103a. In other embodiments, only occurrences of high-ranked keywords may be evaluated, or the production generator 202 may be configured to evaluate non-high ranked keywords only when a determination of relatedness, as further discussed below, fails to meet a certain predetermined threshold level.

Accordingly, the time coded keyword generator 102 may be configured to process the audio information of content retrieved by the content retriever, and identify all time points within a first content corresponding to all occurrences of a particular keyword. The time coded keyword generator 102 may store only information related to the time points within the first content corresponding to occurrences of the keywords. In other embodiments, the time coded keyword generator 102 may be configured to identify and store information related to only the relative occurrences of the keyword within in the content, with respect to the other occurrences of the same keyword.

For example, where the first content corresponds to a football game, and the football-domain specific language model includes "touchdown" as a keyword, the time coded keyword generator 102 may determine that the keyword "touchdown" occurs at the following seven time points of the first content (hour, minute, second), 00:01:30; 00:18:45; 00:18:47; 00:19:09; 00:40:20; 00:42:10; 00:42:15; 01:05:05. Accordingly, the time coded keyword generator 102 may be configured to store the keyword occurrence information in a data structure associating the keyword with the time code information indicating the time point of the content at which the keyword occurs, as shown in FIG. 4A.

In another embodiment, the time coded keyword generator 102 may be configured to identify occurrences of the keyword and store information only regarding the relative time occurrences within the first content. For example, in continuing the above "touchdown" keyword example, the time coded keyword generator 102 may store keyword occurrence information which indicates only the number of seconds between each occurrence. Therefore, since the 00:01:30 and the 00:18:45 occurrences of "touchdown" are separated by 17 minutes and 15 seconds, the time coded keyword generator 102 may store 00:17:15, or 1035 in total seconds, as separating the first and second occurrences of the keyword. Accordingly, as the third occurrence of the keyword is 00:18:47, the difference between the second and third occurrences is only 2 seconds, and thus 00:00:02, or 2 total seconds, may be stored as the second relative occurrence value. This may be continued until all occurrences of all keywords have been identified as values representing the time between each subsequent occurrence of the same keyword, as shown in FIG. 4B.

Thus the time coded keyword generator 102 may determine all absolute occurrences within the first content of each keyword in the domain-specific language model, or in another embodiment the time coded keyword generator 102 may determine all relative occurrence values within the first content of each keyword, wherein the relative occurrence values represent time intervals between each occurrence. FIGS. 4A and 4B are simplified representations of the data generated by the time coded keyword generator 102, those of ordinary skill in the art will understand that the data may be stored in various formats and data structures for efficient storage, indexing, search, and retrieval.

For example, the time coded keyword generator 102 may store, in a memory of the system or in a memory of a sever computer as discussed above, the word occurrence data in a table, hash table, linked list, weighted graph, search tree, and the like. Thus, the stored keyword information would not be understandable by a human, however the stored structure of the data may be optimized for searching, along with absolute or relative time point information for each particular word occurrence within the audio information. In some embodiments as discussed, the data values included in such a data structure representation may correspond to the absolute or relative occurrences of combined phrases, terms, or sentences in addition to words included in the content audio information. Referring back to FIG. 1, as discussed the time coded keyword generator 102 may generate keyword occurrence data for every keyword provided in the domain specific language model 103 stored in the language model database. The time coded keyword generator 102 may store the keyword occurrence data in a memory or at a server computer to be associated with first content for later retrieval and processing by the production generator 202 with other content retrieved by the content retriever 203.

When a first content and a second content obtained from the content retriever are being processed by production generator 202, based on the first keyword occurrence data associated with the first content and the second keyword occurrence data associated with the second content, the production generator 202 may generate determination information indicating whether the first content and the second content are related, or in some cases whether they both correspond to the same event or closely similar video content.

In continuing the example of a SUPERBOWL football game, if the first content and second content both correspond to similar video of the same game, the audio commentary—although generated by completely different productions—will likely have similar occurrences of domain specific keywords, and intervals therebetween, since they are referring to the same events, with the same relative timing between said events, happening in the game. Therefore, if a touchdown is scored by a player "Odell Beckham Jr." with five minutes left in the first quarter having a length of 15 minutes, then another touchdown is scored by the same player with three minutes left in the second quarter (a difference of 17 minutes), the keyword occurrence data may reflect that high occurrences of the keywords "touchdown," "Odell," and "Beckham" will have similar intervals despite the first content and the second content having different commentators announcing the game. Based on such determinations, the production generator 202 may generate difference amount information, and may generate determination information regarding the relatedness of the first content and second content.

Accordingly, in the case where the keyword occurrence data for the first and second content are stored as values indicating the relative positioning of each occurrence of keywords within the content, the production generator 202 may be configured to evaluate the amount of differences between the corresponding intervals of the content. Thus, referring back to FIG. 4B, where the second keyword occurrence data indicates a different set of interval values, for example: 970, 4, 3, 18, 1000, 8, 8, 7, 1205, the production generator may evaluate and generate difference amount information in relation to the first keyword occurrence data. In a simple example, the production generator 202 may evaluate difference amounts between the interval of the first keyword occurrence data and the corresponding interval of the second keyword occurrence data. Where the intervals are found to be similar, or exceed a certain threshold, the production generator may generate information indicating that the first content and the second content are related.

In some embodiments, the production generator 202 may evaluate time coded keyword information for more than one keyword when evaluating the same first content and second content. The production generator 202 may be configured to evaluate time code information for at least a threshold number of keywords, or in other embodiments, the production generator 202 may evaluate time code information for additional keywords within the domain specific language model when a confidence interval of similarity determination between the first content and the second content fails to meet a threshold level. In such embodiments, the production generator 202 may determine that the first content and the second content are not identical or similar only after a threshold number of keywords have been evaluated, and a confidence interval still fails to meet a threshold level.

In other embodiments, the production generator 202 may be configured to identify groupings of occurrences within each time coded keyword data, and evaluate difference amounts based on logical groupings. For example, referring to FIG. 4B, the production generator may identify a grouping of occurrences around the intervals 5 and 6, based on a proximity of the occurrences relative to the other occurrences of the keyword. In the second keyword occurrence data discussed above, the production generator may identify groupings among the "4, 3" interval values and the "8, 8, 7" interval values. In other embodiments, the production generator performs normalization on the occurrence data between the first and second content to normalize the number of intervals or occurrences across the occurrence information.

Figure 5A:
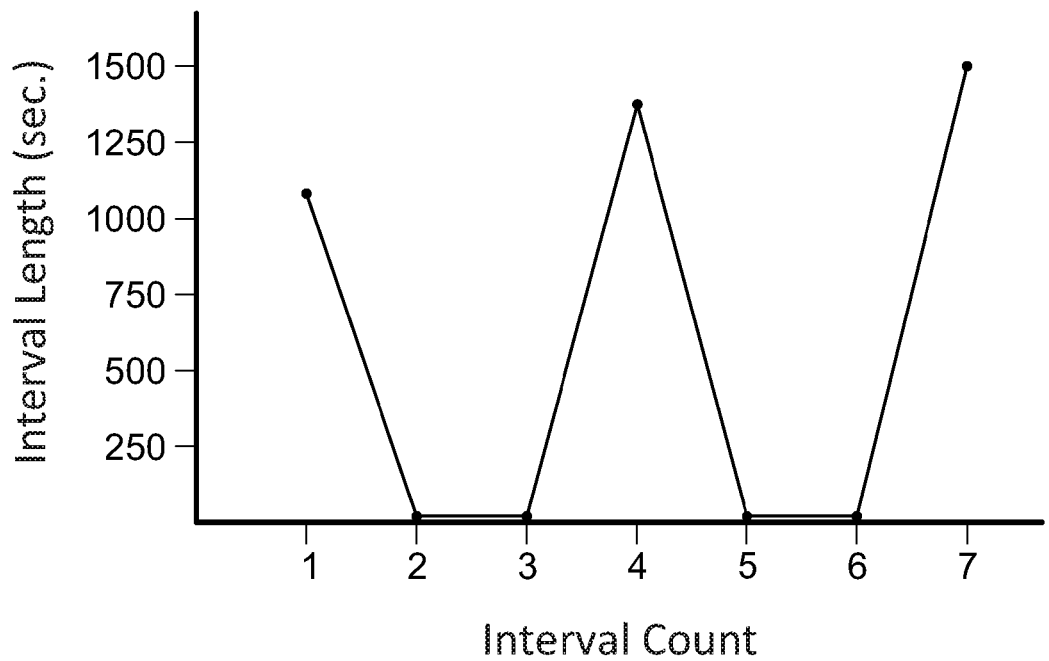
FIGS. 5A and 5B are illustrations of graphical representations of keyword occurrence data generated by the system according to one embodiment of the present disclosure.
Figure 5B:
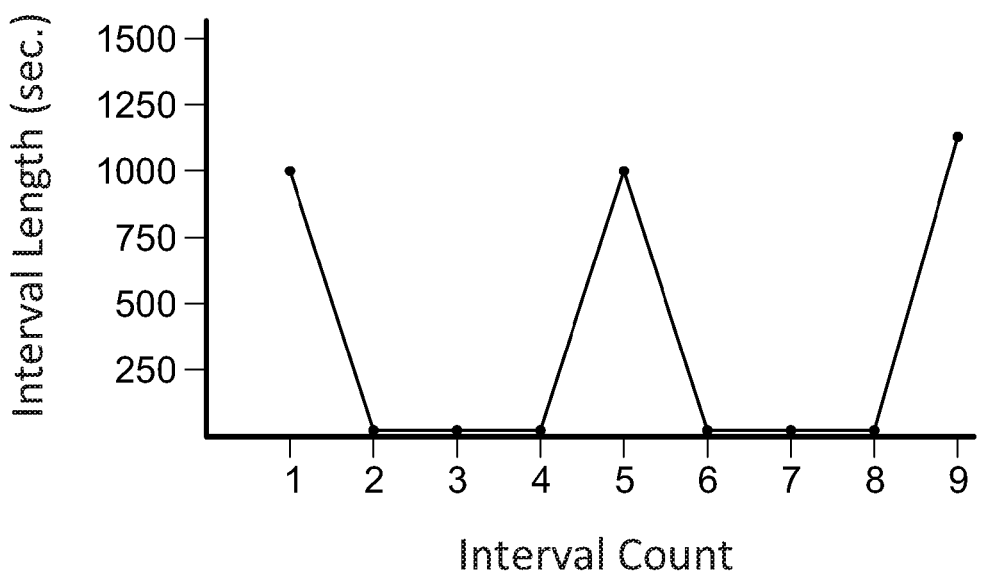

As shown in FIG. 5A, the keyword occurrence values for the first content may be represented on a graph on an x-axis for interval count, and y-axis for interval length. FIG. 5A may have 7 total occurrences of the keyword as shown. By contrast, as shown in FIG. 5B, the keyword occurrences for the second content may be represented on a graph on a normalized x-axis for evaluation with the first content graph representation. FIG. 5B may have 9 total occurrences of the keyword as shown. The production generator may evaluate patterns in the keyword occurrence data, including grouped occurrences, and percentage of similarity between the occurrence information. In some embodiments, the production generator may use a confidence interval or probabilistic modeling to generate a likelihood determination of relatedness between the first content and the second content.

Figure 6A:
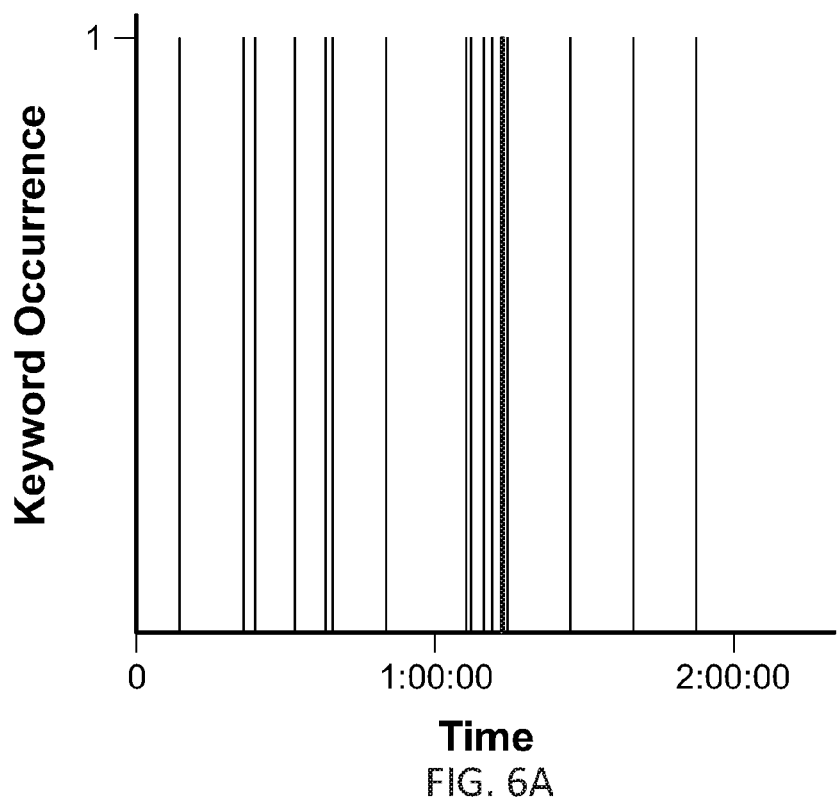
FIGS. 6A and 6B are illustrations of graphical representations of additional keyword occurrence data generated by the system according to one embodiment of the present disclosure.
Figure 6B:
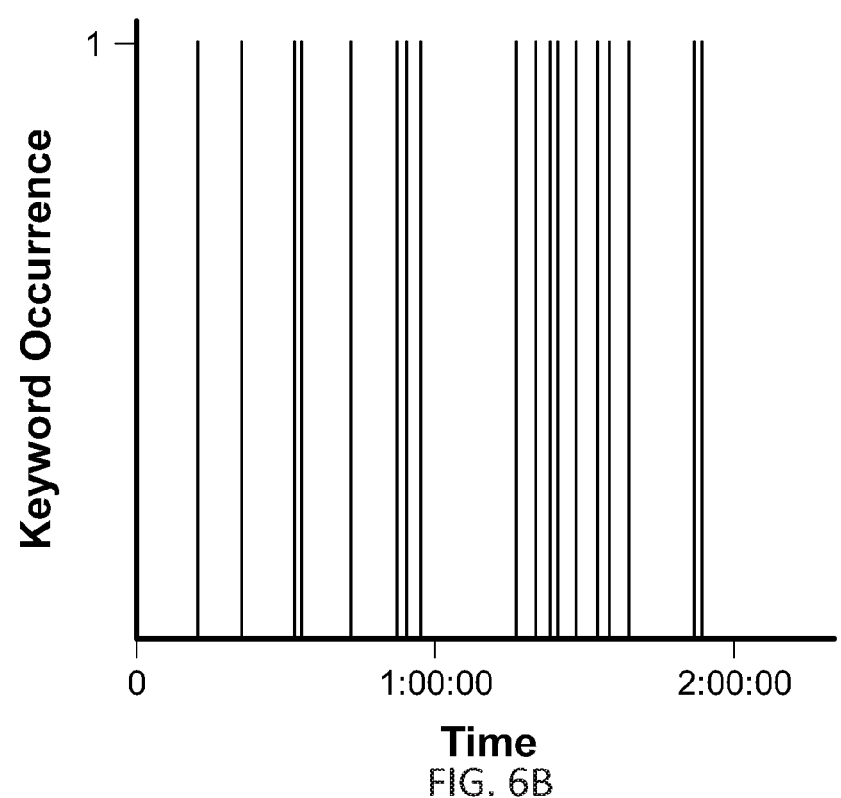

As another example, FIG. 6A shows a graph representation of keyword occurrence information corresponding to absolute time point values of each keyword occurrence. The occurrence information is represented along an x-axis for time of the content, and a binary y-axis indicating each occurrence. FIG. 6B shows a graph representation of another keyword occurrence information corresponding to absolute time point values for another piece of video content. The production generator is configured to evaluate difference amounts of the occurrence events by comparing each occurrence, identifying groupings of occurrences, or using a confidence interval or probabilistic modeling to generate a likelihood determination of relatedness between the first content and the second content.

In some cases, the absolute time point values may not return reliable determination information since video content from different productions may have different start and end times of the content. For example, a broadcast of a football game from one production may include a pre-game show lasting up to 30 minutes, whereas a broadcast from another distributor may begin the video content mere minutes before the start of the game. In such a case, the absolute time point values may not return accurate determination information on the relatedness of the first and second video content. Thus, the relative keyword occurrence information embodiment as discussed above also addresses this problem inherent in many content evaluation and broadcast systems.

Referring back to FIG. 2, the production generator 202 may generate amount difference information, corresponding to probability determination information of the relatedness between the first and second content. In the above examples, the embodiments were discussed with respect to only a first and second content, however the disclosure contemplates that the system is capable of processing and generating amount difference information for numerous pieces of content, indicating which content has a high probability of similarity with others, and which content is determined to be unique. In other embodiments, the production generator 202 may not be determining a relatedness between two pieces of content, but may be generating the determination information of a single piece of content with respect to certain provided parameters, keyword occurrence data, or searched information in order to identify the most relevant or similar piece of content with the given parameters.

Figure 7:
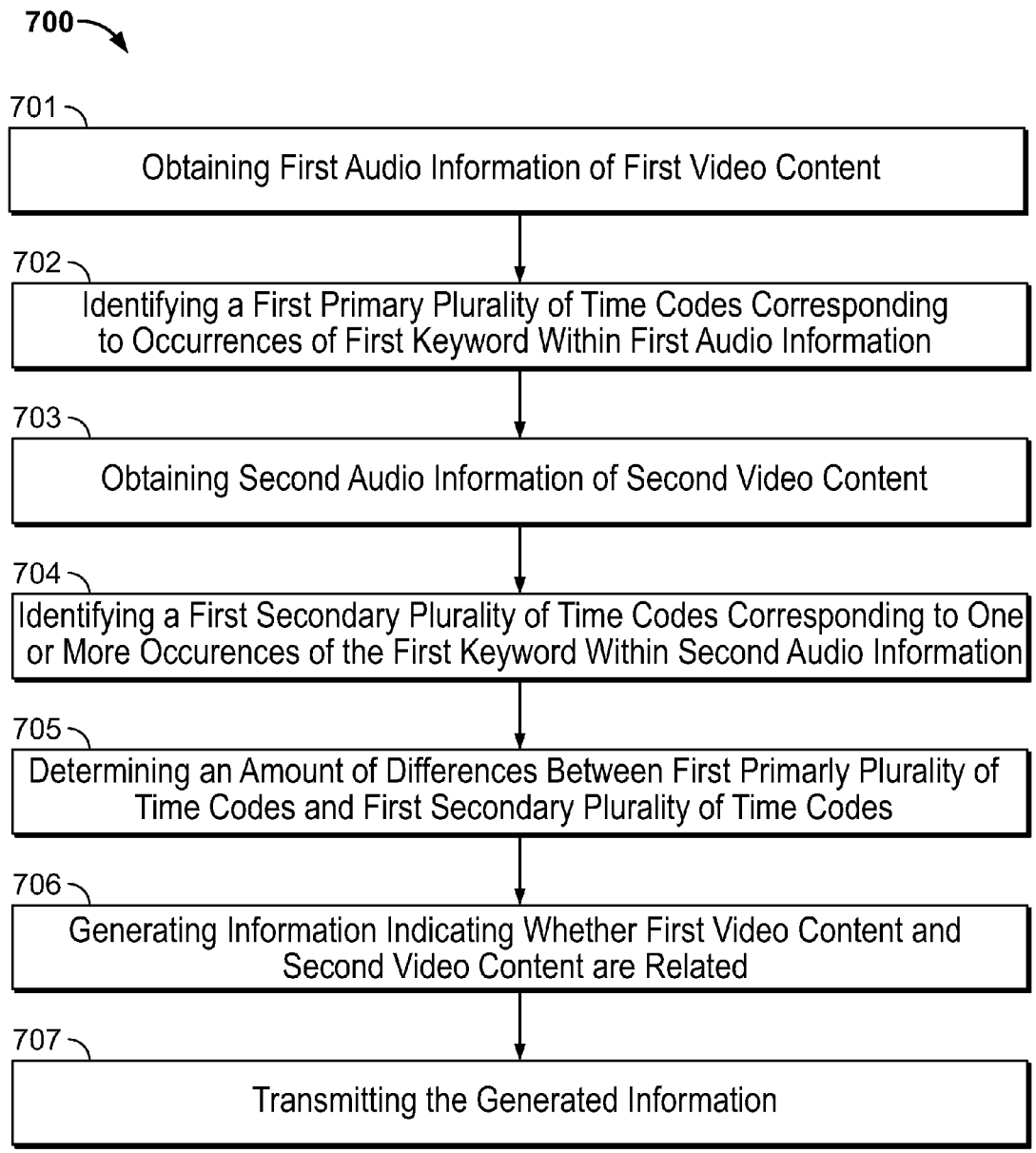
FIG. 7 is an illustration of a method of controlling related content in accordance with an embodiment of the present disclosure.

Referring to FIG. 7, a method for controlling related video content based on domain specific language models is shown according to one embodiment of the present disclosure. As shown in FIG. 7, the method may include obtaining first audio information of first video content at block 701 and identifying a first primary plurality of time codes corresponding to one or more occurrences of a first keyword relative to each other within the first audio information at block 702. The method further includes obtaining second audio information of second video content shown at block 703, identifying a first secondary plurality of time codes corresponding to one or more occurrences of the first keyword relative to each other within the second audio information shown at block 704, and further determining an amount of differences between the first primary plurality of time codes and the first secondary plurality of time codes at 705. Additionally, the embodiment of the method includes generating information indicating whether the first video content and the second video content are related based on the determined amount of differences and transmitting the generated information via the communication unit, shown respectively at blocks 706 and 707.

Accordingly, embodiments of systems and methods of the current disclosure may provide vast improvements to existing systems and methods for controlling related video content based on domain specific language models. Audio transcript information may be processed to generate keyword occurrence information for domain specific keywords occurring within the content.

Further, various systems and methods to generate domain specific language models based on processed content as discussed above may be implemented to provide improved functionality to determine relevant keywords for particular domains and subject matter of video content. Additionally, various systems and methods may be implemented to identify groupings and patterns within the generated keyword occurrence information between two pieces of content improve the functionality of systems and methods for identifying relatedness and controlling related video content.

Figure 8:
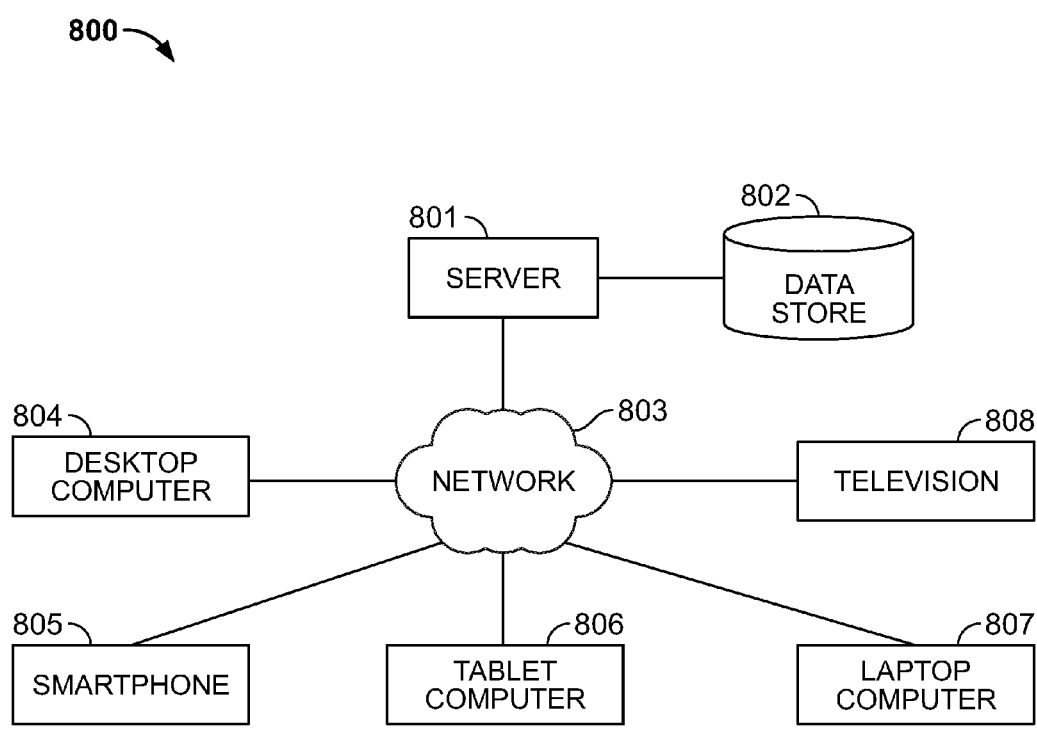
FIG. 8 is an illustration of a computing environment in accordance with an embodiment of the present disclosure.

In selected embodiments, the features and aspects disclosed herein may be implemented in computer hardware, discussed further below with respect to FIG. 9, within a computing environment 800 shown in FIG. 8, which may include one or more computer servers 801. A server 801 may be operatively coupled to one or more data stores 802 (e.g., databases, indexes, files, or other data structures). A server 801 may connect to a data communication network 803 comprising a local area network (LAN), a wide area network (WAN) (e.g., the Internet), a telephone network, a satellite or wireless communication network, or some combination of these or similar networks.

One or more client devices 804, 805, 806, 807, 808 may be in communication with the server 801, and a corresponding data store 802 via the data communication network 803. Such client devices 804, 805, 806, 807, 808 may include, for example, one or more laptop computers 807, desktop computers 804, smartphones and mobile phones 805, tablet computers 806, televisions 808, or combinations thereof. In operation, such client devices 804, 805, 806, 807, 808 may send and receive data or instructions from or to the server 801, in response to user input received from user input devices or other input. In response, the server 801 may serve data from the data store 802, alter data within the data store 802, add data to the data store 802, or the like or combinations thereof.

In selected embodiments, the server 801 may stream or transmit one or more video files including video content, audio content, encoded data, generated data, and/or metadata from the data store 802 to one or more of the client devices 804, 805, 806, 807, 808 via the data communication network 803. The devices may output video content from the video file using a display screen, projector, or other video output device. For example, the video file may comprise a clip of a movie, television show, live programming, news broadcast, or portion thereof for output using a display device of one or more of the client devices. In certain embodiments, the system 200 configured in accordance with the features and aspects disclosed herein may be configured to operate within or support a cloud computing environment. For example, a portion of, or all of, the data store 802 and server 801 may reside in a cloud server.

Figure 9:
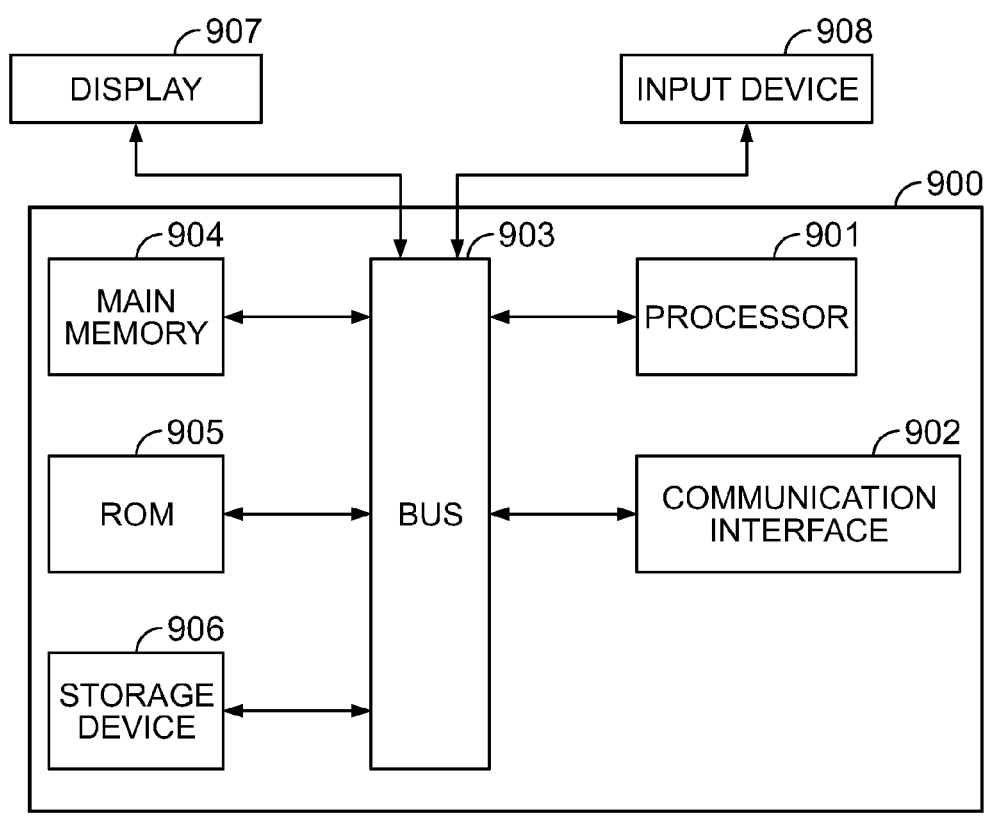
FIG. 9 is an illustration of a hardware device in accordance with an embodiment of the present disclosure.

Referring to FIG. 9, an illustration of an example computer 900 is provided. One or more of the devices 804, 805, 806, 807, 808 of the system 800 may be configured as or include such a computer 900. In selected embodiments, the computer 900 may include a bus 903 (or multiple buses) or other communication mechanism, a processor 901, main memory 904, read only memory (ROM) 905, one or more additional storage devices 906, a communication interface 902, or the like or sub-combinations thereof. The embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

A bus 903 or other communication mechanism, including multiple such buses or mechanisms, may support communication of information within the computer 900. A processor 901 may be connected to a bus 903 and process information. In selected embodiments, a processor 901 may be a specialized or dedicated microprocessor configured to perform particular tasks in accordance with the features and aspects disclosed herein by executing machine-readable software code defining the particular tasks. Main memory 904 (e.g., random access memory—or RAM—or other dynamic storage device) may be connected to a bus 903 and store information and instructions to be executed by a processor 901. Main memory 904 may also store temporary variables or other intermediate information during execution of such instructions.

Read only memory 905 (ROM) or some other static storage device may be connected to a bus 903 and store static information and instructions for a processor 901. An additional storage device 906 (e.g., a magnetic disk, optical disk, memory card, or the like) may be connected to a bus 903. The main memory 904, ROM 905, and the additional storage device 906 may include a non-transitory computer-readable medium holding information, instructions, or some combination thereof, for example instructions that when executed by the processor 901, cause the computer 900 to perform one or more operations of a method as described herein. A communication interface 902 may also be connected to a bus 903. A communication interface 902 may provide or support two-way data communication between a computer 900 and one or more external devices (e.g., other devices contained within the computing environment).

In selected embodiments, a computer 900 may be connected (e.g., via a bus) to a display 907. A display 907 may use any suitable mechanism to communicate information to a user of a computer 900. For example, a display 907 may include or utilize a liquid crystal display (LCD), light emitting diode (LED) display, projector, or other display device to present information to a user of the computer 900 in a visual display. One or more input devices 908 (e.g., an alphanumeric keyboard, mouse, microphone) may be connected to a bus 903 to communicate information and commands to a computer 900. In selected embodiments, one input device 908 may provide or support control over the positioning of a cursor to allow for selection and execution of various objects, files, programs, and the like provided by the computer 900 and displayed by a display 907.

The computer 900 may be used to transmit, receive, decode, display, or the like one or more video files. In selected embodiments, such transmitting, receiving, decoding, and displaying may be in response to a processor 901 executing one or more sequences of one or more instructions contained in main memory 904. Such instructions may be read into main memory 904 from another non-transitory computer-readable medium (e.g., a storage device).

Execution of sequences of instructions contained in main memory 904 may cause a processor 901 to perform one or more of the procedures or steps described herein. In selected embodiments, one or more processors in a multi-processing arrangement may also be employed to execute sequences of instructions contained in main memory 904. Alternatively, or in addition thereto, firmware may be used in place of, or in connection with, software instructions to implement procedures or steps in accordance with the features and aspects disclosed herein. Thus, embodiments in accordance with the features and aspects disclosed herein may not be limited to any specific combination of hardware circuitry and software.

Non-transitory computer readable medium may refer to any medium that participates in holding instructions for execution by a processor 901, or that stores data for processing by a computer, and comprise all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, a communication interface 902 may provide or support external, two-way data communication to or via a network link. For example, a communication interface 902 may be a wireless network interface controller or a cellular radio providing a data communication network connection. Alternatively, a communication interface 902 may comprise a local area network (LAN) card providing a data communication connection to a compatible LAN. In any such embodiment, a communication interface 902 may send and receive electrical, electromagnetic, or optical signals conveying information.

A network link may provide data communication through one or more networks to other data devices (e.g., client devices as shown in the computing environment 800). For example, a network link may provide a connection through a local network of a host computer or to data equipment operated by an Internet Service Provider (ISP). An ISP may, in turn, provide data communication services through the Internet. Accordingly, a computer 900 may send and receive commands, data, or combinations thereof, including program code, through one or more networks, a network link, and communication interface 902. Thus, a computer 900 may interface or otherwise communicate with a remote server (e.g., server 801), or some combination thereof.

The various devices, modules, terminals, and the like discussed herein, including the transcript generator, keyword identifier, comparator, language model generator, server computer, and the like, may be implemented on a computer by execution of software comprising machine instructions read from computer-readable medium, as discussed above. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A system for controlling related video content, the system comprising:
   a memory configured to store information;
   one or more processors configured to:
      obtain first audio information of first video content from the memory;
      identify a first primary plurality of time codes indicating lengths of time between occurrences of a first keyword within the first audio information;
      obtain second audio information of second video content from the memory;
      identify a first secondary plurality of time codes indicating lengths of time between occurrences of the first keyword within the second audio information;
      compare patterns of occurrences of the first keyword in the first video content and the first keyword in the second video content based on the first primary plurality of time codes and the first secondary plurality of time codes; and
      generate information indicating whether the first video content and the second video content are related based on the compared patterns; and
      output the generated information indicating whether the first video content and the second video content are related, wherein the outputted generated information enables a selection between the first video content or the second video content for storage or display.

2. The system of claim 1, wherein the outputted generated information enables the selection of the first video content or the second video content for display.

3. The system of claim 1, wherein the one or more processors are further configured to identify the first primary plurality of time codes and the second primary plurality of time codes using acoustic keyword spotting based respectively on the first audio information and the second audio information.

4. The system of claim 1, wherein the one or more processors are further configured to identify the first primary plurality of time codes and the second primary plurality of time codes using transcripts generated respectively from the first audio information and the second audio information.

5. The system of claim 1, wherein the one or more processors are further configured to:
   identify a second primary plurality of time codes indicating lengths of time between occurrences of a second keyword within the first audio information;

identify a second secondary plurality of time codes indicating lengths of time between occurrences of the second keyword within the second audio information; and compare additional patterns of occurrences of the second keyword in the first video content and the second keyword in the second video content based on the second primary plurality of time codes and the second secondary plurality of time codes;

wherein the generated information is further based on the compared additional patterns.

6. The system of claim 1, wherein the one or more processors are further configured to identify the first keyword based on a language model assigned to a type of content corresponding to the first video content.

7. The system of claim 1, wherein the one or more processors are further configured to:

obtain a sample video content of a plurality of sample video content all corresponding to a first type of video content; and cause the memory to store a first language model comprising a plurality of terms specific to the first type of video content based on text corresponding to audio information of the sample video content.

8. The system of claim 7, wherein the text is obtained from closed captioning data associated with the sample video content.

9. The system of claim 7, wherein the one or more processors are configured to select the plurality of terms to be specific to the first type of video content when a frequency of occurrence of each of the plurality of terms within the sample video content exceeds a predetermined threshold.

10. The system of claim 7, wherein the one or more processors are further configured to identify the first keyword based on the first language model.

11. The system of claim 1, wherein the generated information comprises probability information indicating a probability that the first content and the second content are related.

12. A method of controlling related video content, the method comprising:

obtaining first audio information of first video content;

identifying a first primary plurality of time codes indicating lengths of time between occurrences of a first keyword within the first audio information;

obtaining second audio information of second video content;

identifying a first secondary plurality of time codes indicating lengths of time between occurrences of the first keyword within the second audio information;

comparing patterns of occurrences of the first keyword in the first video content and the first keyword in the second video content based on the first primary plurality of time codes and the first secondary plurality of time codes; and generating information indicating whether the first video content and the second video content are related based on the compared patterns; and outputting the generated information indicating whether the first video content and the second video content are related, wherein the outputted generated information enables a selection between the first video content or the second video content for storage or display.

13. The method of claim 12, wherein the outputted generated information enables the selection of the first video content or the second video content for display.

14. The method of claim 12, further comprising identifying the first primary plurality of time codes and the second primary plurality of time codes using acoustic keyword spotting based respectively on the first audio information and the second audio information.

15. The method of claim 12, further comprising identifying the first primary plurality of time codes and the second primary plurality of time codes using transcripts generated respectively from the first audio information and the second audio information.

16. The method of claim 12, further comprising:

identifying a second primary plurality of time codes indicating lengths of time between occurrences of a second keyword within the first audio information;

identifying a second secondary plurality of time codes indicating lengths of time between occurrences of the second keyword within the second audio information; and comparing additional patterns of occurrences of the second keyword in the first video content and the second keyword in the second video content based on the second primary plurality of time codes and the second secondary plurality of time codes;

wherein the generated information is further based on the compared additional patterns.

17. The method of claim 12, further comprising identifying the first keyword based on a language model assigned to a type of content corresponding to the first video content.

18. The method of claim 12, further comprising:

obtaining a sample video content of a plurality of sample video content all corresponding to a first type of video content;

storing a first language model comprising a plurality of terms specific to the first type of video content based on text corresponding to audio information of the sample video content.

19. The method of claim 18, wherein the text is obtained from closed captioning data associated with the sample video content.

20. The method of claim 18, further comprising selecting the plurality of terms to be specific to the first type of video content when a frequency of occurrence of each of the plurality of terms within the sample video content exceeds a predetermined threshold.

21. The method of claim 18, further comprising identifying the first keyword based on the first language model.

22. The method of claim 12, wherein the generated information comprises probability information indicating a probability that the first content and the second content are related.

23. A machine-readable non-transitory medium having stored thereon machine-executable instructions for:

obtaining first audio information of first video content;

identifying a first primary plurality of time codes indicating lengths of time between occurrences of a first keyword within the first audio information;

obtaining second audio information of second video content;

identifying a first secondary plurality of time codes indicating lengths of time between occurrences of the first keyword within the second audio information;

comparing patterns of occurrences of the first keyword in the first video content and the first keyword in the second video content based on the first primary plurality of time codes and the first secondary plurality of time codes; and generating information indicating whether the first video content and the second video content are related based on the compared patterns; and outputting the generated information indicating whether the first video content and the second video content are related, wherein the outputted generated information enables a selection between the first video content or the second video content for storage or display.

* * * * *